United States Patent
Miyamoto (10) Patent No.: US 9,449,751 B2
(45) Date of Patent: Sep. 20, 2016

(54) REACTOR AND REACTOR MANUFACTURING METHOD, AND POWER CONVERTER

(71) Applicant: Shingo Miyamoto, Toyota (JP)

(72) Inventor: Shingo Miyamoto, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 104 days.

(21) Appl. No.: 14/420,192

(22) PCT Filed: Nov. 5, 2013

(86) PCT No.: PCT/IB2013/002730
§ 371 (c)(1),
(2) Date: Feb. 6, 2015

(87) PCT Pub. No.: WO2014/072815
PCT Pub. Date: May 15, 2014

(65) Prior Publication Data
US 2015/0179329 A1 Jun. 25, 2015

(30) Foreign Application Priority Data
Nov. 12, 2012 (JP) ................ 2012-248585

(51) Int. Cl.
| | |
|---|---|
| H01F 27/08 | (2006.01) |
| H01F 27/02 | (2006.01) |
| H01F 41/12 | (2006.01) |
| H02M 1/12 | (2006.01) |
| H02M 1/42 | (2007.01) |
| H01F 27/40 | (2006.01) |

(52) U.S. Cl.
CPC .......... *H01F 27/085* (2013.01); *H01F 27/022* (2013.01); *H01F 41/127* (2013.01); *H02M 1/12* (2013.01); *H02M 1/42* (2013.01); *H01F 2027/406* (2013.01); *Y10T 29/4902* (2015.01)

(58) Field of Classification Search
CPC ...................................................... H01F 41/005
USPC ........................................................ 307/151
See application file for complete search history.

(56) References Cited

U.S. PATENT DOCUMENTS

| | | | |
|---|---|---|---|
| 6,842,100 | B1 | 1/2005 | Kim |
| 2010/0226410 | A1 | 9/2010 | Maeno et al. |
| 2011/0156853 | A1 | 6/2011 | Kato et al. |

FOREIGN PATENT DOCUMENTS

| | | |
|---|---|---|
| CN | 102132365 A | 7/2011 |
| EP | 2 315 220 A | 4/2011 |

(Continued)

OTHER PUBLICATIONS

Partial translation of Japanese Office Action Issued in JP Patent Application No. 2012-248585 on Oct. 10, 2014.

*Primary Examiner* — Robert Deberadinis
(74) *Attorney, Agent, or Firm* — Sughrue Mion, PLLC (57) ABSTRACT

A manufacturing method for a reactor in which resin for covering at least a part of a coil is formed integrally with the coil comprise a step of manufacturing a molded product and a step of attaching a temperature sensor such that the temperature sensor is opposed to a first face. The step of manufacturing the molded product includes following i) to iii): i) arranging the reactor in a cavity space for injection-molding of resin; ii) fixing the coil with the surface of a mold brought into contact with the first face and a second face located at positions which sandwich the coil on the periphery of the coil; and iii) injecting resin into the cavity space to cover at least a coil surface around the first face and a coil surface around the second face with the resin, with the first face and the second face exposed.

15 Claims, 12 Drawing Sheets

(56) References Cited

FOREIGN PATENT DOCUMENTS

| | | |
|---|---|---|
| JP | 59-011431 U | 1/1984 |
| JP | 09-229775 A | 9/1997 |
| JP | 2001-044052 A | 2/2001 |
| JP | 2009-267360 A | 11/2009 |
| JP | 2010-203998 A | 9/2010 |
| JP | 2010-219251 A | 9/2010 |
| JP | 2010-226138 A | 10/2010 |
| JP | 2010-272771 A | 12/2010 |
| JP | 2010-272772 A | 12/2010 |

REACTOR AND REACTOR MANUFACTURING METHOD, AND POWER CONVERTER

BACKGROUND OF THE INVENTION

1. Field of the Invention

The present invention relates to a reactor and a reactor manufacturing method, and a power converter including the same reactor. In particular, the present invention relates to a reactor incorporated in the power converter of an electric vehicle, and a manufacturing method of the same.

2. Description of Related Art

The reactor is a passive element which is used for improvement of power factor, suppression of harmonic current, smoothing of direct current and the like in an electric circuit. The reactor is also sometimes used as a component of a voltage converter which raises/lowers DC voltage. The reactor may be called "inductor".

The reactor is used for an electric vehicle as well. The electric vehicle includes a motor which acts as a driving source and the reactor is used in an electric circuit for a motor thereof. The electric circuit includes an inverter circuit and a voltage converter circuit. In a specific type of the electric vehicle, a driving voltage of the motor is higher than an output voltage of a battery and therefore, the voltage converter for raising the output voltage of the battery is provided prior to the inverter circuit. In this specification, a motor drive unit which includes the inverter circuit and the voltage converter circuit is called power converter or power control unit (referred to as PCU).

The reactor is an element which is likely to generate heat. Particularly, a circuit which handles a large current as in the electric vehicle generates a large amount of heat. Thus, a temperature sensor may be installed to monitor a temperature of the reactor (Japanese Patent Application Publication No. 2010-203998 (JP 2010-203998 A), Japanese Patent Application Publication No. 2010-219251 (JP 2010-219251 A), Japanese Patent Application Publication No. 2009-267360 (JP 2009-267360 A), Japanese Patent Application Publication No. 2010-219251 (JP 2010-219251 A), and Japanese Patent Application Publication No. 09-229775 (JP 09-229775A)).

A technology disclosed in JP 2010-203998 A is as follows. A reactor includes a ring-like core having parallel portions. A bobbin is mounted on each parallel portion and then, coil is wound around the bobbins. The two bobbins have a flange at each end and are connected to each other by the flange. Partition walls extend from the flanges in order to partition between the two bobbins. The partition wall is provided with a slit and a temperature sensor is provided within the slit.

In a reactor disclosed in JP 2010-219251 A, coils are also wound around parallel portions of a core. The two coils are covered with resin and a hole is made in resin between the two coils. A temperature sensor is embedded in the hole in the resin. According to technology disclosed in JP 2009-267360 A, a hole is made in a core and a temperature sensor is installed in the hole. In reactors disclosed in JP 2010-219251 A and JP 09-267360 A, a part of the coil is covered with resin and a temperature sensor is embedded in the hole provided in the resin.

SUMMARY OF THE INVENTION

A manufacturing method for reactor according to an aspect of the present invention includes a step of manufacturing a molded product and a step of attaching a temperature sensor such that the temperature sensor is opposed to the first face. The step of manufacturing the molded product includes following i) to iii): i) arranging the reactor in a cavity space for injection-molding of resin; ii) fixing the coil with the surface of a mold brought into contact with the first face and the second face located at positions which sandwich the coil on the periphery of the coil; and iii) injecting resin into the cavity space to cover at least a coil surface around the first face and a coil surface around the second face with the resin, with the first face and the second face exposed. A face of the reactor is called first face just for the sake of convenience and any one of the face and its rear face may be called first face. Hereinafter, the face to which a temperature sensor is to be attached is specified as the first face.

According to the above-described manufacturing method, an exposed face (first face and second face) which is necessarily produced when manufacturing a coil-resin integrated molded product is used and the temperature sensor is arranged thereon. Because no special process for providing a hole for arranging the temperature sensor is required, the reactor can be manufactured at low cost.

The reactor according to another aspect of the present invention includes a core, a coil, a cover, and a temperature sensor. The coil includes a first face and a second face, the first face is a part of the periphery of the coil, and the second face locates at the rear side of the first face. The cover is made of resin and integrally covers at least a part of the coil, and the first face and the second face are exposed from the cover. The first face is a part of the periphery of the coil and exposed from the cover. The second face is located at the rear side of the first face and exposed from the cover. The temperature sensor is attached such that it is opposed to the first face. At least coil surfaces around the first face and the second face are covered with the cover.

The power converter according to another aspect of the present invention includes a capacitor, a substrate, a reactor, and a case. The capacitor is configured to smooth a current. The case accommodates the capacitors, the substrate and the reactor. The reactor includes a third face which is a part of the periphery of the coil and exposed from the cover. The first face is located nearer any one of the capacitor and the substrate than the third face.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
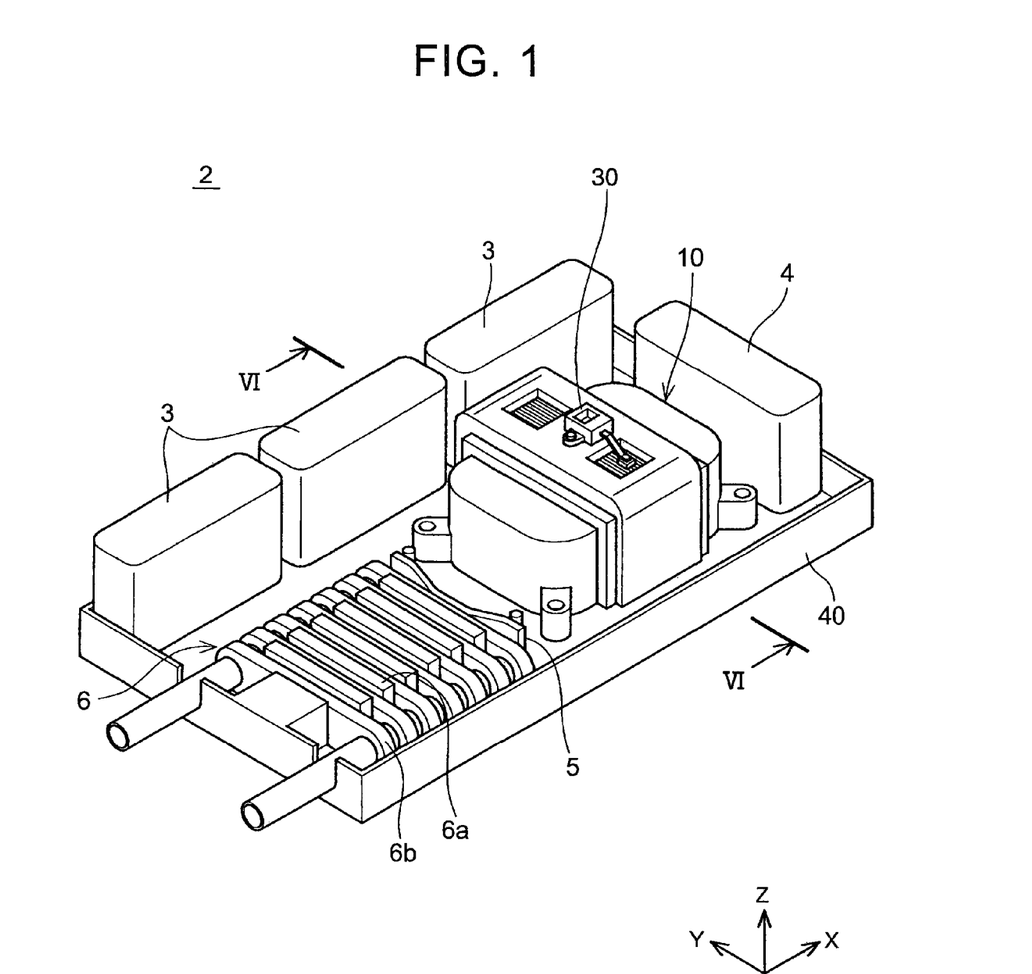
FIG. 1 is a perspective view of a power control unit including a reactor.
Figure 2:
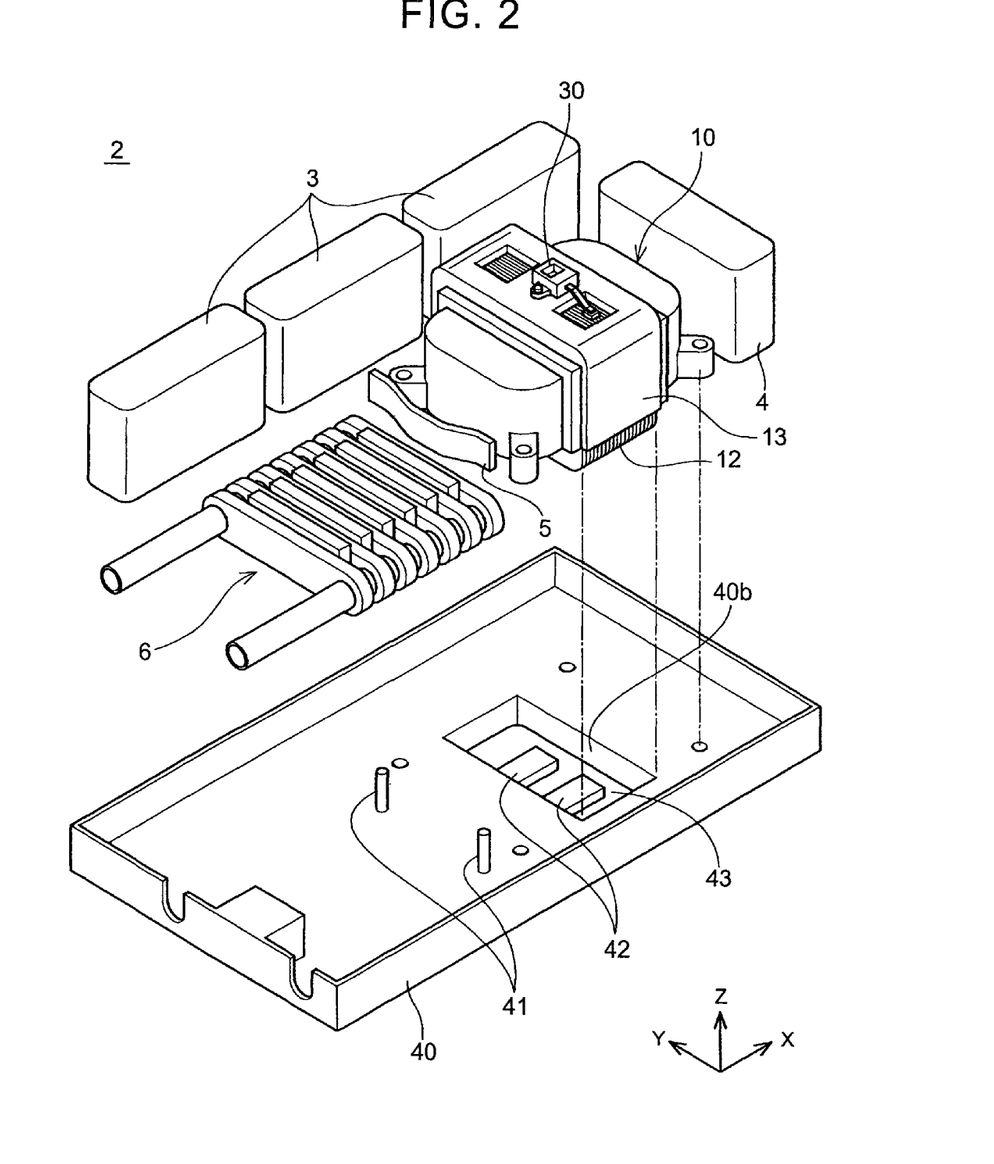
FIG. 2 is an exploded perspective view of the power control unit.

First, a power control unit (PCU) provided with a reactor will be described. FIG. 1 is a perspective view of a power control unit 2 and FIG. 2 is an exploded perspective view of the power control unit 2. The power control unit 2 is a device which is loaded on an electric vehicle to raise DC power from a battery, convert the power to AC power and output it to a motor. Hereinafter, the power control unit 2 is simply referred to as PCU 2. The PCU 2 is usually incorporated in a cover and FIG. 1 shows a state of the uncovered PCU 2.

As an incorporated circuit, the PCU 2 includes a voltage converter circuit and an inverter circuit. In terms of hardware, the PCU 2 includes a layered unit 6 in which a plurality of flat type semiconductor cards 6a which contain a switching element such that it is sealed with resin and a plurality of flat type cooling plates 6b are layered alternately, a reactor 10, capacitors 3, 4, and a control board (not shown) loaded with electronic parts, and these components are stored in a case 40. In the meantime, in FIGS. 1, 2, a side wall of the case 40 is represented lower than actually in order to facilitate understanding of a layout of the components in the case.

The switching element contained in the semiconductor card 6a is a transistor which is used in the inverter circuit or the voltage converter circuit, typically an insulated gate bipolar transistor (IGBT). The layered unit 6 in which the plurality of the semiconductor cards 6a and the plurality of the cooling plates 6b are layered alternately is supported between the case side wall and a supporting column 41 together with a leaf spring 5.

The capacitors 3 suppress pulsation of a current input to the voltage converter circuit and smooth the current. The capacitor 4 suppresses pulsation of an output current from the voltage converter circuit and smoothes the current. Both of the capacitors are capacitors for smoothing a current supplied to a drive motor of an electric vehicle. The former is sometimes called filter capacitor because it smoothes an input current to the voltage converter circuit. Thus, the PCU 2 includes a filter capacitor 3 for suppressing pulsation of current input to the voltage converter circuit and the smoothing capacitor 4 for suppressing pulsation of output current from the voltage converter circuit in addition to the voltage converter circuit for raising the voltage of a battery and the inverter circuit for converting an output of the voltage converter circuit to AC power. The filter capacitor 3 and the smoothing capacitor 4 are sometimes collectively called "current smoothing capacitor".

The reactor 10 is a main part of the voltage converter circuit, in which current for driving a motor flows. The reactor 10 repeats accumulation or discharge of electric energy by turning ON/OFF the switching element to raise or lower the voltage. The reactor 10 accumulates or discharges electric energy by using magnetic resistance of the coil. Thus, generation of heat from the reactor is large. Although most part of the reactor 10 is covered with a cover 13 of resin, the surface of the coil 12 is exposed on the case 40 side of the reactor 10. The case 40 has a dent 40b and when the reactor 10 is fixed in the case 40, the exposed portion of the reactor 10 is fit to the dent 40b. A cooler 43 and a radiating sheet 42 are arranged on the bottom of the dent 40b. The reactor 10 is arranged such that the bottom face of the coil 12 is opposed to the cooler 43 via the radiating sheet 42. The cooler 43 cools the coil 12 via the radiating sheet 42. The bottom face of the coil 12 is a plane located on a downward side in the Figure, i.e., a plane on a negative direction side of the Z-axis. In the meantime, the cover 13 is a resin cover which is formed by injection-molding resin around the coil 12 and the core 11, so that it serves as a retainer for fixing the coil 12 to the case 40. The radiating sheet 42 may be omitted and a single side face (bottom face in the Figure) of the coil 12 may keep contact with the cooler 43. A reference numeral 30 denotes a temperature sensor module 30 attached to the reactor 10.

Figure 3:
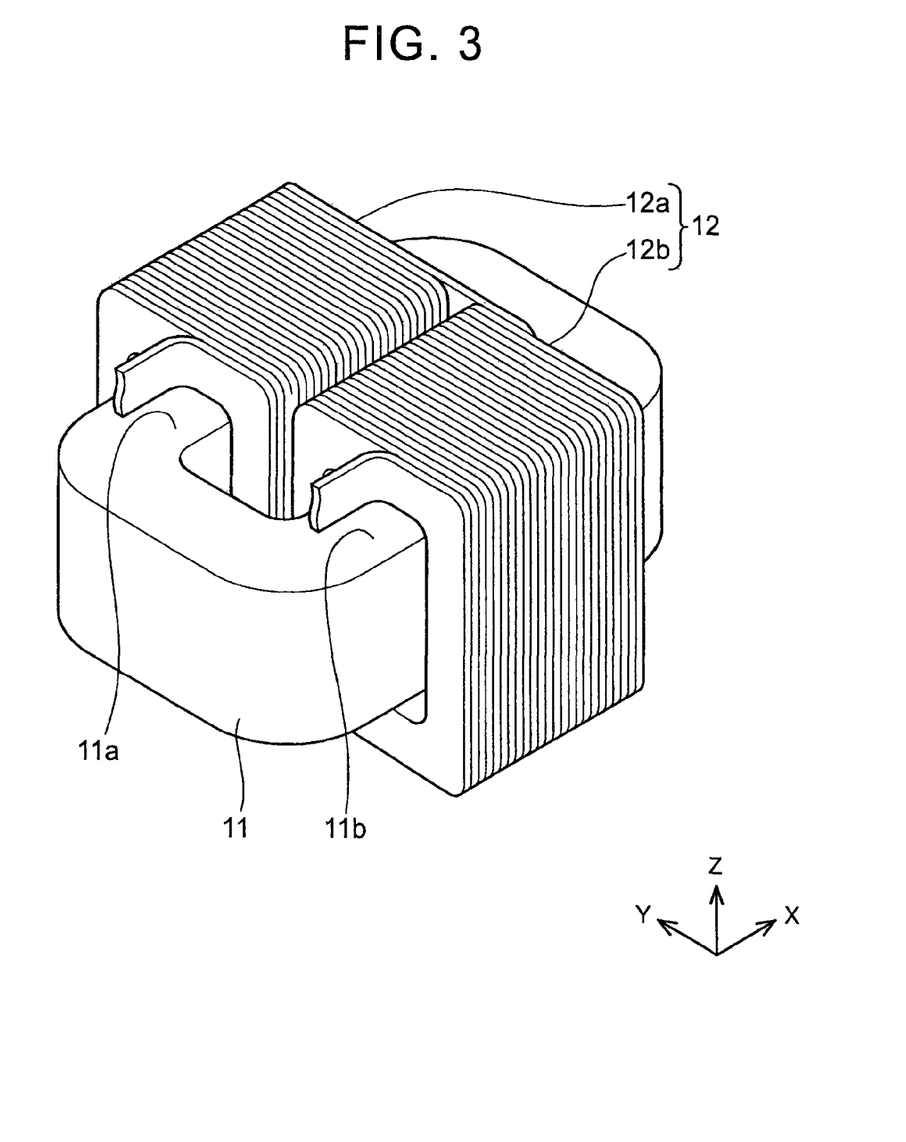
FIG. 3 is a perspective view of a core and a coil in the reactor.

A structure of the reactor 10 will be described further in detail. FIG. 3 is a perspective view of the core 11 and the coil 12 with the cover 13 removed. Although actually, resin is charged in between the core 11 and the coil 12, representation of resin is omitted. The core 11 is formed in an annular shape having parallel portions 11a, 11b. Those parallel portions 11a, 11b pass through the coil bodies 12a, 12b respectively. The coil bodies 12a, 12b are formed by winding a rectangular wire edgewise. In another words, the reactor 10 includes the two coil bodies 12a, 12b which are arranged side by side laterally with the winding axes parallel to each other. In the meantime, although the two coil bodies 12a, 12b are constituted of a single rectangular wire, acting as a single coil in electrical terms, structurally, the two coil bodies are connected to each other with the rectangular wire. When handling the two coil bodies 12a, 12b as a single coil without a distinction therebetween hereinafter, the expression "coil 12" will be used.

Figure 4:
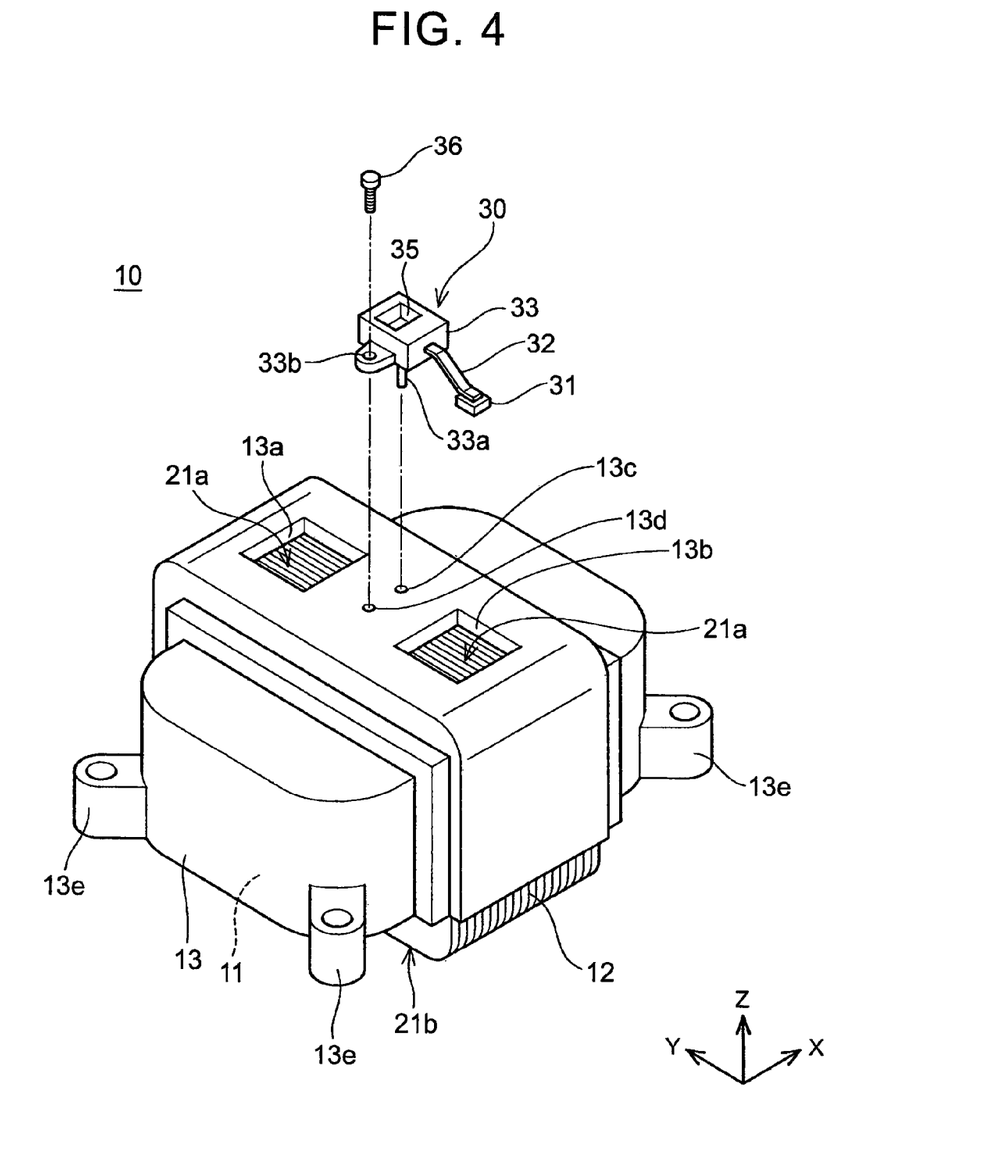
FIG. 4 is a perspective view of the reactor prior to attachment of a temperature sensor.

FIG. 4 is a diagram showing a state in which the cover 13 of resin is attached to the core 11 and the coil 12. In FIG. 4, representation of a lead portion extending from the coil 12 is omitted. As described previously, the cover 13 is formed by injection-molding. The cover 13 covers the coil 12 except the surface at a portion of the bottom of the coil 12 and a portion of the surface of the top side thereof while covering the core 11. A bottom face of the core 11 projecting from an end of the coil 12 is also exposed. Flanges 13e extend from four corners of the cover 13 and an insertion hole for a bolt for fixing the reactor 10 is provided in each of the flanges 13e. One of reasons for providing the cover 13 of resin is to insulate the coil 12 and the core 11 from surrounding parts and another reason is to provide the flanges 13e for fixing the reactor 10 to the case 40. Further, the reason for integral molding of the cover 13 and the reactor 10 is to fix the core 11 and the coil 12.

Windows 13a, 13b through which the surface of the coil 12 is exposed exist on the top surface of the cover 13. This window is formed as a result of pressing a mold against the coil 12 to intensify the flatness of a side face of the coil 12 when injection-molding the cover 13. The side face of the coil 12 refers to a face (bottom face) which comes into contact with the cooler 43. Manufacturing process of the reactor will be described in detail below.

As described above, in the reactor 10, the surface of the coil 12 is exposed at three positions. A face exposed through the windows 13*a*, 13*b* is referred to as a first face 21*a* and a face which is adjacent to the cooler 43 via the radiating sheet 42 is referred to as a second face 21*b* (see FIG. 4). The first face 21*a* and the second face 21*b* are located on a peripheral surface of the coil. The peripheral surface refers to a surface including a side face and end faces of the coil. The side face of the coil refers to a face perpendicular to the winding axis of the coil and the end face of the coil refers to a face in the winding axis direction of the coil. The second face 21*b* is a face opposite to the first face 21*a* via the coil 12. In another words, the second face 21*b* corresponds to a face located on a rear side of the first face 21*a*. The first face 21 a and the second face 21*b* are a pair of parallel side faces of the coil 12 of the substantially square pole. A coil surface around the first face 21 a and the second face 21*b* is covered with the cover 13 of resin. An area of the second face 21*b* is larger than an area of the first face 21*a*. As described below, a temperature sensor 31 is attached to any one of the two first faces 21*a*, and of the two first faces 21*a*, a face on which no temperature sensor 31 is attached is sometimes called third face.

Figure 5:
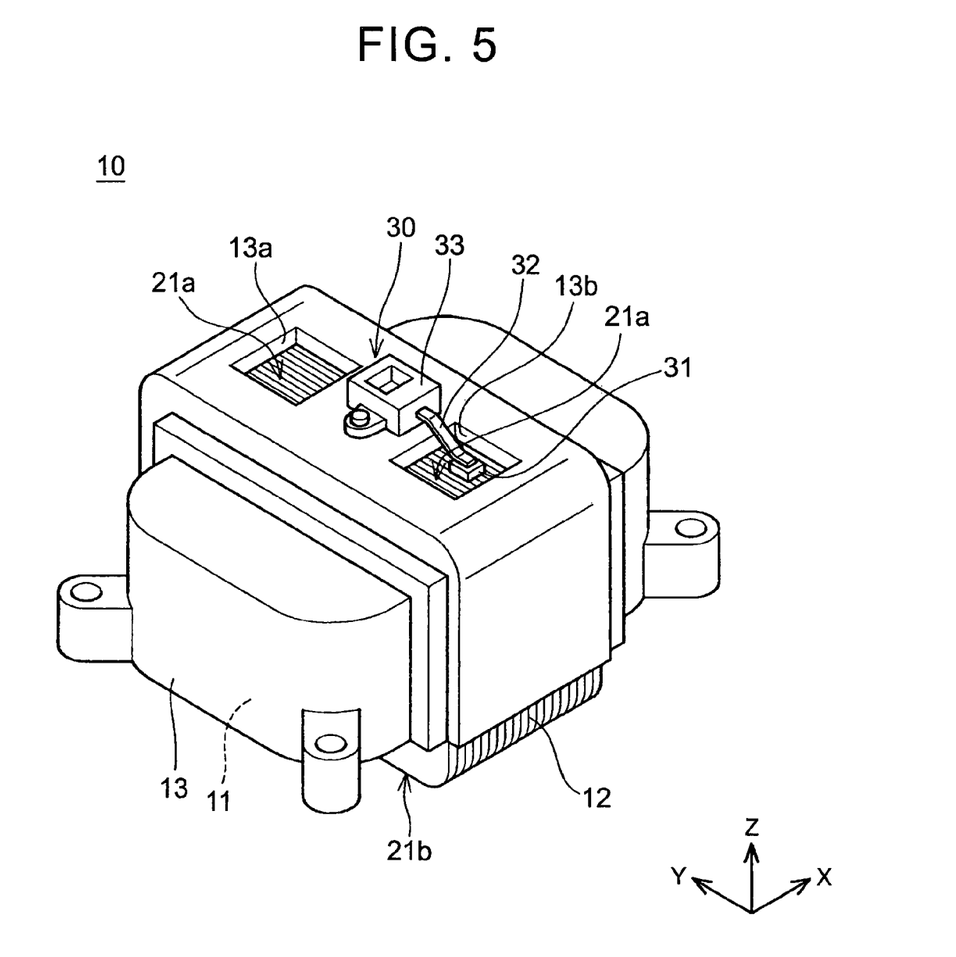
FIG. 5 is a perspective view of the reactor after attachment of the temperature sensor.

FIG. 4 shows the reactor 10 before attachment of the temperature sensor module 30. FIG. 5 shows the reactor 10 after the attachment of the temperature sensor module 30. The temperature sensor module 30 is attached to measure a temperature of the reactor. Sensor data from the temperature sensor 31 is transmitted to a controller (not shown) and used for various controls. For example, it is used to monitor an overheat of the reactor 10 or adjust the cooling performance of the cooler 43. The temperature sensor 31 is supported by a supporting member 33 and a leaf spring 32. The temperature sensor 31 is pressed against the first face 21*a* of the coil 12 via the window 13*b* by the leaf spring 32. As shown in FIG. 5, the temperature sensor 31 is pressed against the first face 21 a of the coil 12 inside of the frame of the window 13*b* provided in the cover 13, thereby protecting the temperature sensor 31 to prevent the temperature sensor 31 from being separated from the coil 12 due to a contact with other parts. The frame of the window 13*b* refers to surrounding walls of resin which define the window. A dent denoted by reference numeral 35 is a connector with which a plug of a cable for transmitting the sensor data is coupled. Although a lead wire for transmitting a signal extends from the temperature sensor 31 to the connector 35, representation of the lead wire is omitted in the Figure.

The supporting member 33 has a positioning pin 33*a* and a bolt hole 33*b* on the bottom face thereof. The positioning pin 33*a* is inserted through a hole 13*c* made in the cover 13 to determine a position of the temperature sensor module 30. Further, a bolt 36 is inserted through the bolt hole 33*b* in the supporting member 33 and the bolt hole 13*d* in the cover 13 to fix the temperature sensor module 30.

Figure 6:
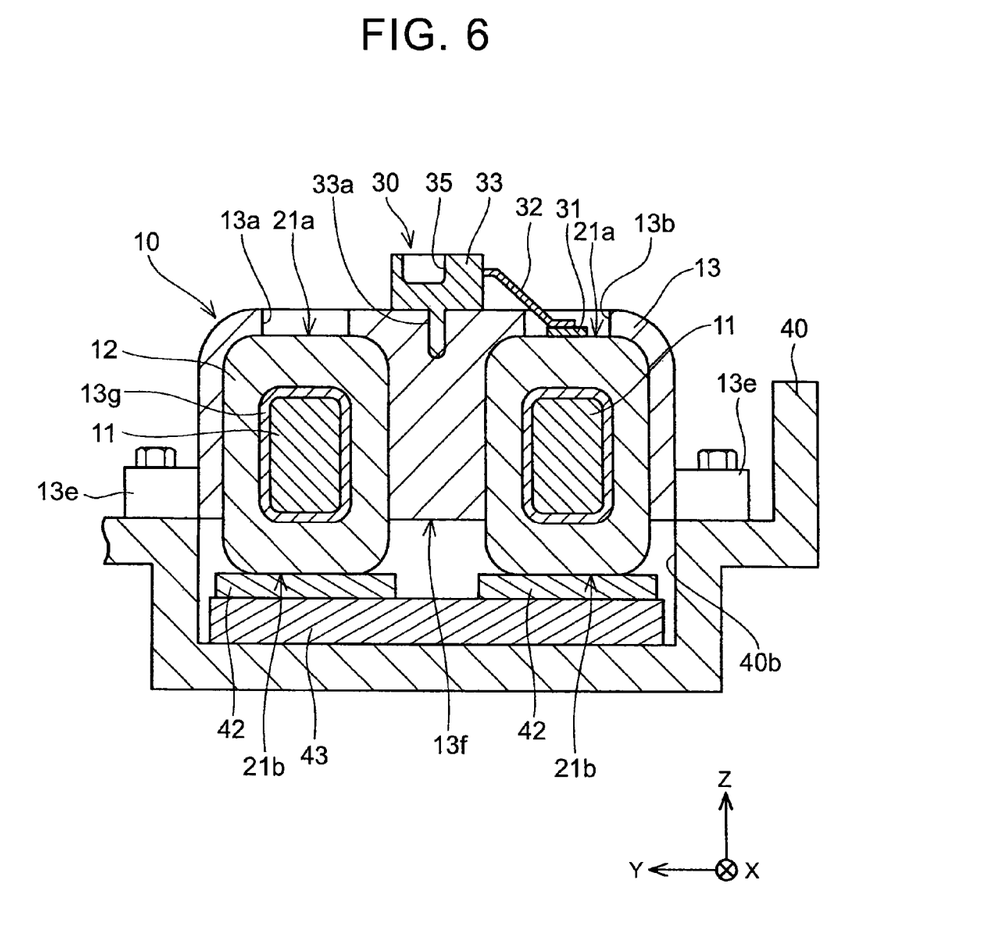
FIG. 6 is a sectional view of the power control unit taken along the line VI-VI in FIG. 1.

FIG. 6 shows a sectional view taken along the line VI-VI in FIG. 6. As described previously, the case 40 has the dent 40*b*, so that the bottom portion of the coil 12 is embedded in the dent 40*b*. The bottom portion of the coil 12 is not covered with the cover 13 but exposed. The cooler 43 is provided in the dent 40*b* and the bottom face of the coil 12 makes contact with the cooler 43 via the radiating sheet 42. The reactor 10 (in particular, the coil 12) is cooled by the cooler 43 via the radiating sheets 42. As described previously, the radiating sheets 42 may be omitted and thus, it may be expressed that the coil 12 is cooled in contact with the cooler 43. Hereinafter, the second face 21*b* which is the bottom face of the coil 12 in contact with the cooler 43 via the radiating sheet 42 is sometimes called cooler contact face.

As shown in FIG. 6, the temperature sensor 31 is pressed against the first face on the coil side face on an opposite side to the cooler 43 across the coil 12. That is, the temperature sensor 31 is pressed against the coil side face on an opposite side to the second face 21*b* which is in contact with the cooler. Although the coil 12 is cooled by the cooler 43, the first face 21 a which the temperature sensor 31 keeps contact with is a relatively high temperature position in an entire portion of the coil 12 because it is the farthest position from the cooler 43. It is desirable that the temperature of a position which may reach a relatively high temperature in the coil 12 can be detected to monitor an overheat of the reactor 10. Because the reactor 10 of the embodiment is in contact with the coil 12 at a position where the temperature sensor 31 is the farthest from the cooler 43, a relatively high temperature in a temperature distribution of the coil 12 can be measured.

The supporting member 33 for the temperature sensor module 30 is situated between the two coils. A gap between the two coil bodies 12*a* and 12*b* is filled with resin of the cover 13 to form a thick portion 13*f*. Because a sufficient thickness is secured in resin of the cover 13 between the coil bodies 12*a* and 12*b*, the supporting member 33 can be fixed firmly to the cover 13 using this thickness. In another words, there is no necessity of preparing any special portion for supporting the temperature sensor module 30 in the reactor 10. More in detail, the positioning pin 33*a* and the bolt 36 (see FIG. 4) of the supporting member 33 are arranged in line parallel to the winding axes of the coil bodies 12*a*, 12*b* between the two coil bodies 12*a* and 12*b*.

As shown in FIG. 6, a gap between the core 11 and the coil 12 is filled with resin 13*g* during injection molding of the cover 13. Although it is permissible to mount a bobbin to the core 11 and wind the coil 12 on the bobbin, the bobbin is omitted in this embodiment.

As described previously, in the reactor 10, the temperature sensor 31 for measuring a temperature of the coil 12 is pressed against the side face of the coil 12 by the leaf spring 32. Consequently, the temperature of the coil can be measured accurately. Further, by pressing the temperature sensor 31 by the leaf spring 32, the temperature sensor 31 comes into contact with the side face of the coil 12 (first face 21*a*) securely regardless of a dimensional tolerance among multiple reactors and an assembly tolerance of the temperature sensor modules 30. Thus, by adopting the above-described structure, dispersion of temperature measurement among individual objects of the mass-produced multiple reactors can be reduced.

Next, a manufacturing method of the reactor 10 will be described with reference to FIGS. 7 to 10. One of methods for manufacturing a reactor in which resin for covering at least part of the coil is molded integrally with the coil is to injection-mold resin with the coil placed in a molding die. At that time, to fix the coil within the molding die, the coil is pressed from both sides thereof. When the resin is taken out of the molding die after injection-molding, the pressed portions are exposed out of the resin.

Figure 7:
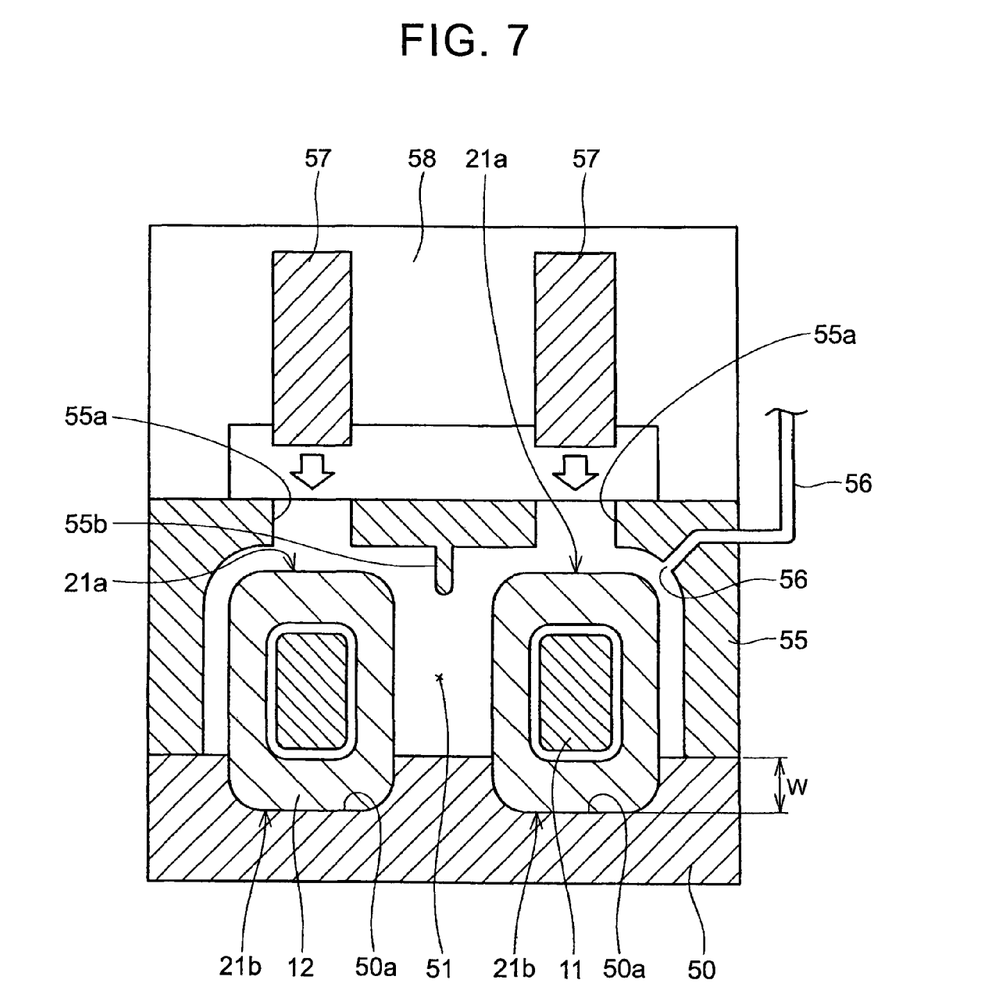
FIG. 7 is a diagram for explaining manufacturing process of the reactor, in particular a diagram for explaining a process for installing the reactor in a mold.
Figure 8:
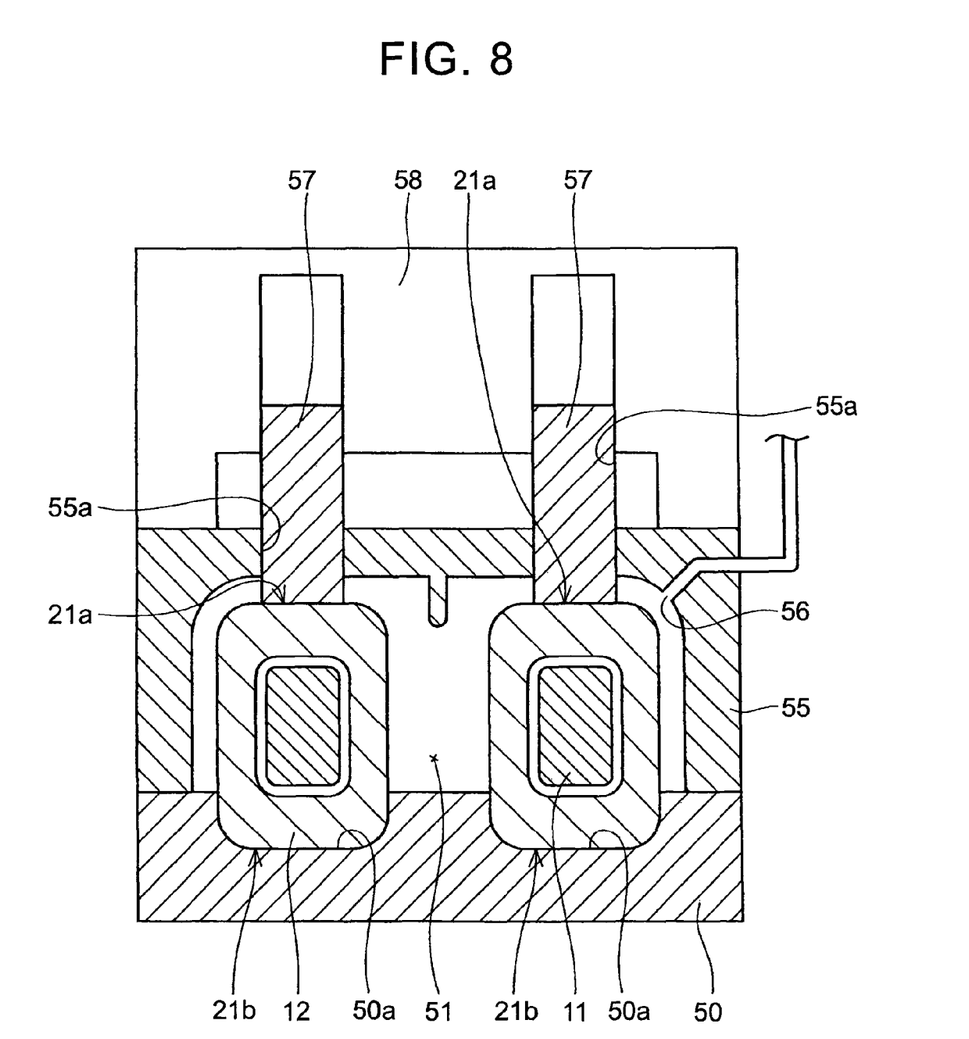
FIG. 8 is a diagram for explaining the reactor manufacturing process, in particular, a diagram for explaining a process for fixing the coil.
Figure 9:
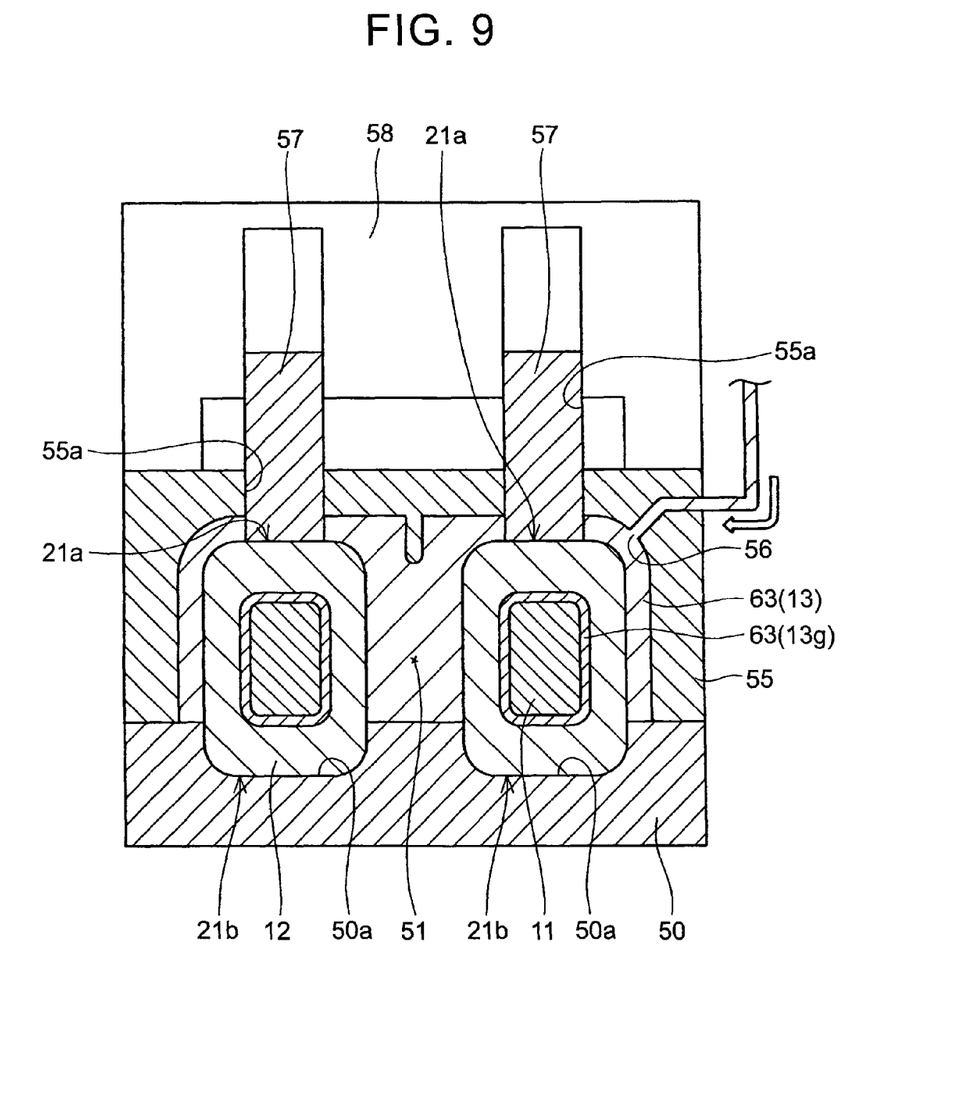
FIG. 9 is a diagram for explaining the reactor manufacturing process, in particular, a diagram for explaining a resin injection process.

A process of mounting the reactor 10 in a molding die will be described. First, the coil 12 and the core 11 are prepared and then, they are set in a cavity 51 of the molding die. The molding die includes an upper molding die 55 and a lower molding die 50. In the meantime, although to fix the core 11 against the coil 12, a case where a bobbin of resin is applied to the core and the coil 12 is fit to the bobbin can be considered, description of the bobbin is omitted in the present embodiment.

The lower molding die 50 has a dent 50a and the two coils are fit to the dents 50a up to a depth W from the bottom face (second face 21b) of each of the coils. No resin flows to any portion which is fit to the dent 50a, so that that portion is an exposed portion upon completion. The coil bottom face in contact with the bottom face of the dent 50a corresponds to the above-mentioned cooler contact face.

The upper molding die 55 has a gate 56 for guiding resin to the cavity 51. A protrusion 55b is provided in the center of a cavity surface of the upper molding die 55 and between the two coils 12a and 12b. The protrusion 55b is a protrusion for forming the hole 13c through which the positioning pin 33a which is the supporting member 33 for the temperature sensor module 30 is to be inserted.

In addition, the upper molding die 55 has a pressing rod 57 for pressing the first face 21a of the coil 12 from upward. Through holes 55a are provided in the cavity surface opposed to the coil side face of the upper molding die 55. The through hole 55a is provided to pass the pressing rod 57 for the first face. A part indicated by reference numeral 58 is an actuator for lifting up/down the pressing rod 57. The actuator 58 is constructed integrally with the upper molding die above the upper molding die 55. Representation and description of a detailed structure of the actuator 58 are omitted.

Subsequently, a process of fixing the coil will be described. The actuator 58 descends the pressing rods 57 to press the first face 21a of each of the coils 12 to fix the coil 12 to a molding die (see FIG. 8). When the coil 12 is pressed from upward, the bottom face (second face 21b) of the coil 12 is forcefully pressed against the bottom surface of the dent 50a in the lower molding die 50. In another words, in a space of the cavity 51, both the side faces of the coil 12 come into contact with the surface of the molding die to fix the coil 12 thereon. The coil 12 is of a substantially square pole, and the first face 21a and the second face 21b correspond to a pair of the side faces parallel to each other. It can be said that of the first face 21a and the second face 21b, the other face acts as a rear face with respect to one face.

As described previously, the coil 12 is formed by winding a rectangular wire edgewise. Because the side face of a coil is formed by arranging a plurality of the rectangular wires side by side, the flatness of the coil side face is low. That is, a coil formed by winding the rectangular wire edgewise has considerable unevenness in the flatness of the coil side face. As described previously in FIG. 6, when the reactor 10 is mounted in the case 40 of the PCU 2, the bottom face (second face 21b) of the coil 12 makes contact with the radiating sheet 42 (or cooler 43). However, if the flatness of the second face 21b is low, a contact area between the coil 12 and the radiating sheet 42 is small, thereby lowering radiation effect. Then, prior to injection of resin into the cavity, the coil 12 is pressed from an opposite side to the second face 21b so as to arrange the surface of wound wires neatly to intensify the flatness of the second face 21b. The surface of the wound wire corresponds to the coil side face. When the flatness of the second face 21b is increased, heat transfer effect from the coil 12 to the radiating sheet 42 is increased, that is, the cooling performance of the coil 12 is also increased. When injection-molding resin to some part, fixing of the part is an indispensable process. That is, nipping and fixing the both sides of the coil 12 with the molding die in the cavity 51 is an indispensable process for forming the cover 13 on the coil 12 integrally. At the same time, the process of fixing the coil 12 is a useful process for intensifying the flatness of the side face of the coil 12.

Next, a process for injecting resin will be described. In this process, resin is injected while the first face 21a is being pressed by the pressing rod 57 (see FIG. 9). Resin 63 is pushed out of a plunger (not shown) and charged into the cavity 51 via the gate 56. A gap between the core 11 and the coil 12 is filled with the resin 63 (corresponding to reference numeral 13g in FIG. 6). The coil 12 continues to be pressed by the pressing rod 57 until the resin 63 is solidified. After the resin 63 is solidified, the coil 12 is mostly fixed with the resin. The second face 21b pressed against the bottom face of the dent 50a in the lower molding die 50 is fixed with an intensified flatness.

Figure 10:
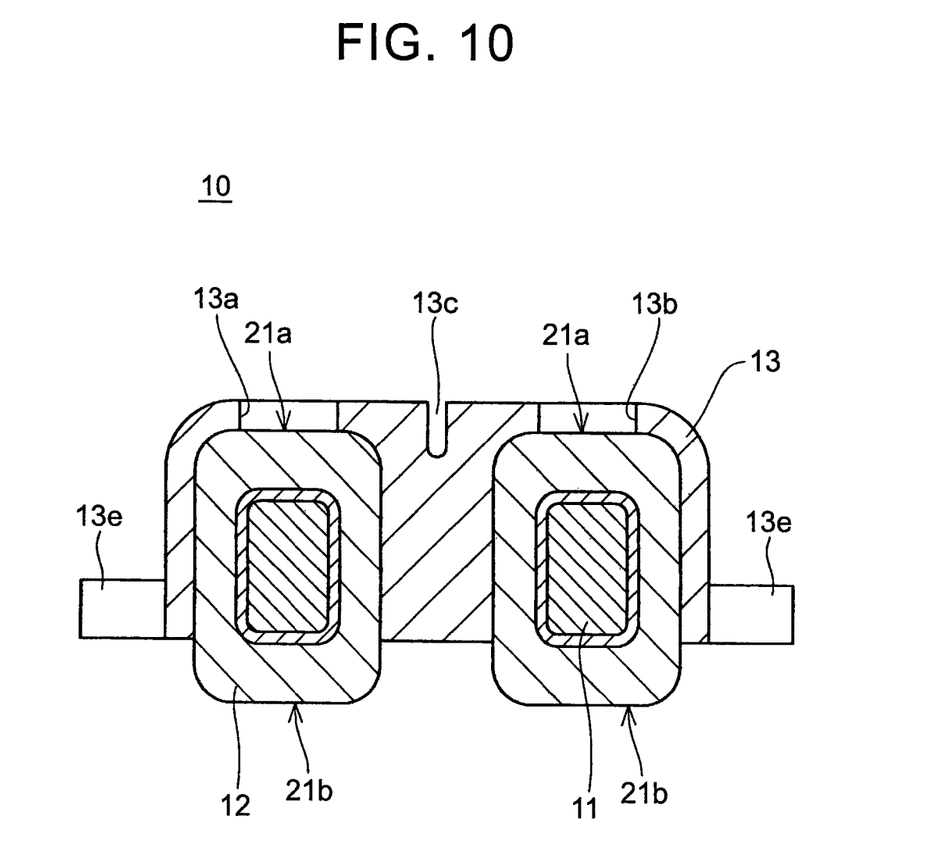
FIG. 10 is a diagram for explaining the reactor manufacturing process, in particular, a diagram for explaining mold removal process.

Further, a process of removing the molding die will be described. In this process, after the resin 63 is solidified, the mold is opened and the reactor 10 is picked out (see FIG. 10). At this stage, the temperature sensor module has not been attached to the reactor 10. The charged resin 63 (see FIG. 9) turns to the cover 13. Because in the mold, as shown in FIG. 10, the first face 21a and the second face 21b of the coil keep contact with the surface of the mold, they turn to exposed portions while a coil surface around the exposed portion is covered with resin. In another words, the first faces 21a which are produced as a result of pressing the top surface of the coil with the pressing rod 57 (see FIGS. 7 to 9) turn to the windows 13a, 13b whose peripheries are surrounded by resin. As described previously, exposure of the first face 21a and the second face 21b is generated as a result of fixing the coil within the cavity of the mold at the time of injection-molding.

As described previously, the windows 13a, 13b provided in the cover 13 are formed collaterally to intensify the flatness of the second face 21b (cooler contact surface) of the coil when injection-molding resin with the reactor 10 placed within the mold. More specifically, the coil 12 is pressed against the mold with the pressing rod 57 while resin is being charged. Traces formed when the pressing rod 57 is separated from the coil 12 after resin is charged and solidified turn to the windows 13a, 13b. A structure in which the reactor 10 and the resin cover 13 are formed integrally is called molded product. By implementing the above processes, the molded product is completed.

Next, the temperature sensor module 30 is attached to the first face 21a to complete the reactor 10. In the reactor 10, the temperature sensor 31 is pressed against the coil side face with the leaf spring 32 through the window 13b which exposes the side face (first face 21a) of the coil. By using the exposed portion (first face 21a) produced collaterally when the resin cover is formed as a place for attaching the temperature sensor, there is no necessity of a process of providing any hole for attaching the temperature sensor. Manufacturing cost of the reactor having the temperature sensor can be suppressed.

Further, a radiating member is attached to the second face 21b of the reactor 10. More specifically, the second face 21b is brought into contact with the cooler 43 via the radiating sheet 42. Alternatively, the second face 21b may be brought into contact with the cooler 43 by omitting the radiating sheet 42. Here, the second face 21b has a larger area than the first face 21a. By attaching the radiating member to a face having a larger area, the cooling performance can be intensified.

As evident from the above-described manufacturing process, the windows 13a, 13b are necessarily formed on a side opposite to the second face 21b (cooler contact face) which makes contact with the cooler 43. By using the window 13a or the window 13b, the temperature sensor 31 comes into contact with the coil at the farthest position from the cooler 43 to measure the temperature of a portion which reaches the highest temperature in the coil. That is, the temperature sensor 31 may be provided at any suitable position for monitoring an overheat of the coil, that is, the window 13a or 13b (first face 21a or second face 21b).

Figure 11:
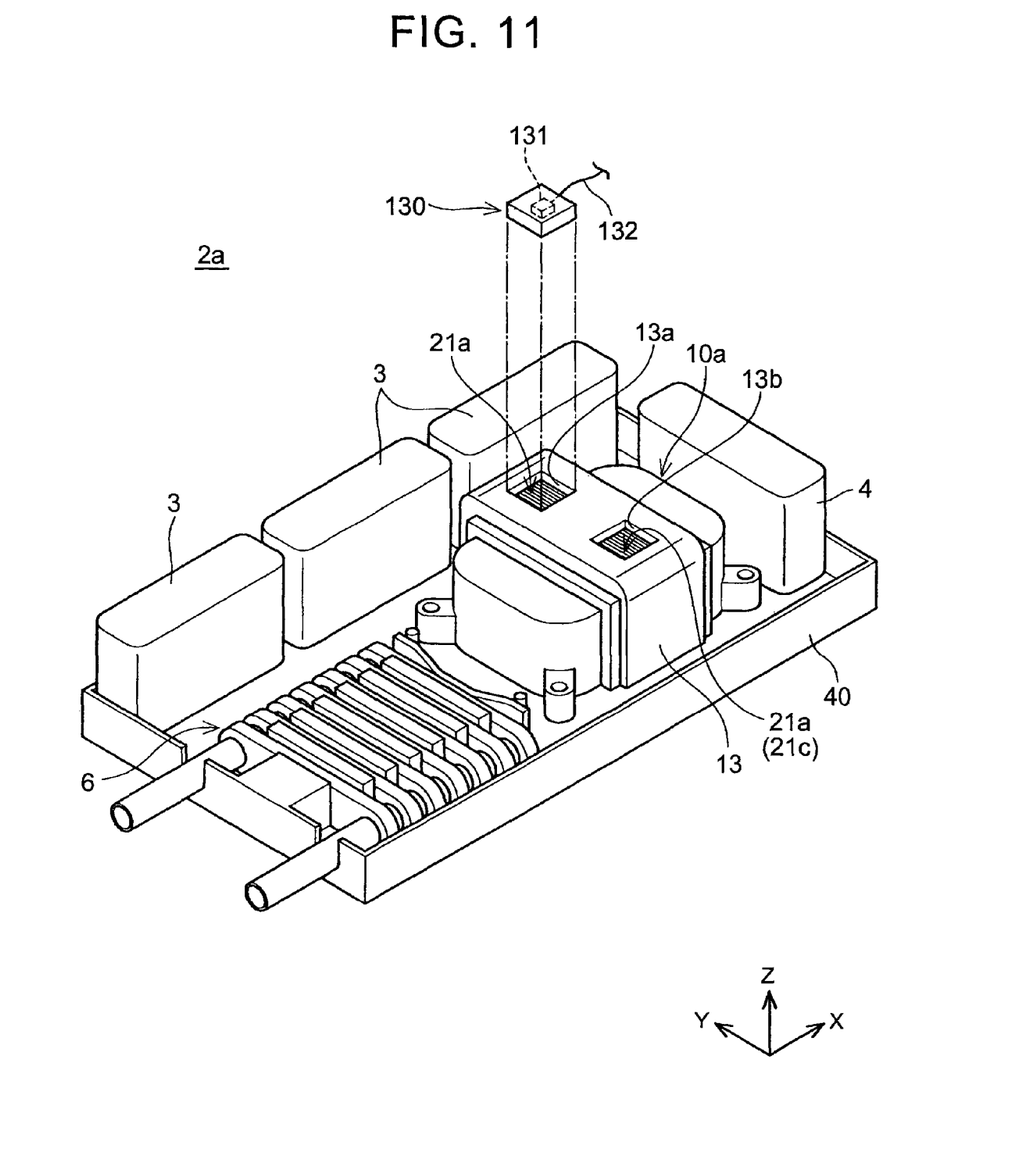
FIG. 11 is a perspective view of a power control unit including a reactor according to a modification, indicating a state prior to installation of a temperature sensor to the reactor.
Figure 12:
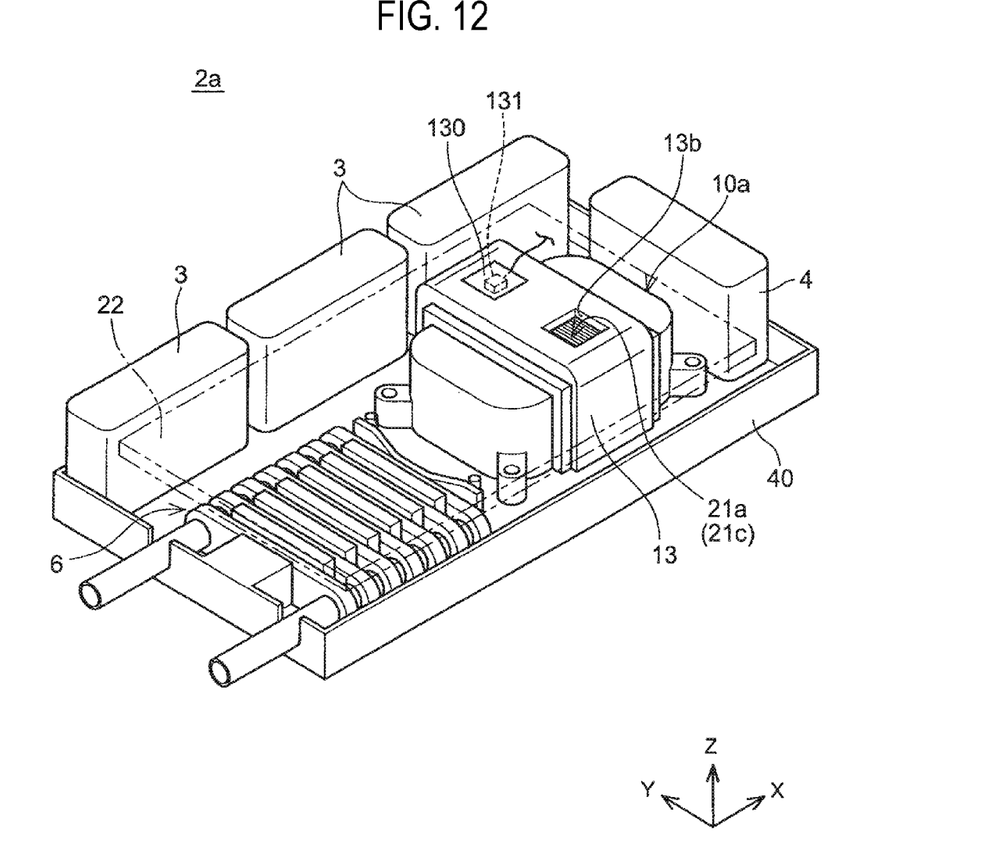
FIG. 12 is a perspective view of the power control unit including the reactor according to a modification, indicating a state after installation of the temperature sensor to the reactor.

A modification will be described with reference to FIG. 11 and FIG. 12. In the reactor described in FIGS. 1 to 6, the temperature sensor 31 is pressed against the side face of the coil 12 by the leaf spring 32. In the examples of FIGS. 11, 12, the window 13a provided in the cover 13 of the coil is closed by a lid 130, and a temperature sensor 131 is buried in a lid 130. In another words, one of the first faces 21a of the coil 12 is covered with the lid 130. At this time, the temperature sensor 131 is provided to be opposed to the first face 21a. The lid 130 is formed of, for example, high-temperature resin and fixed to the window 13a with adhesive. A cable 132 for transmitting a sensor signal from the temperature sensor 131 extends from the lid 130. FIG. 11 shows a perspective view of the PCU 2a prior to attachment of the lid 130 and FIG. 12 shows a perspective view of the PCU 2a after attachment of the lid 130. An end of the cable 132 is connected to a control board although not shown. Hereinafter, of the two first faces 21a, a first face to which the lid 130 is not attached is called third face 21c. A dotted line indicated in FIG. 12 denotes a substrate 22 provided including a circuit for controlling a voltage converter and an inverter. In FIG. 12, the substrate 22 is represented with the dotted line to facilitate understanding of components below the substrate.

A reactor 10a according to the present modification has the same structure as the reactor 10 in FIG. 1 except the lid 130 having the temperature sensor instead of the temperature sensor module 30. Although the cover 13 of the reactor 10a has a plurality of the windows (13a, 13b), the lid 130 with the temperature sensor is attached to the window 13a. More electronic components (capacitors 3, 4) exist around the window 13a than the window 13b. Although as shown FIGS. 11, 12, only the capacitor 4 exists around the window 13b (third face 21c), the capacitors 3, 4 exist around the other window 13a (first face 21a). Heat generated from the coil 12 diffuses around via the windows 13a, 13b. By closing the window having more electronic components nearby with the lid 130, heat diffusion near electronic components can be prevented. As a result, an influence upon other electronic components by heat generated from the reactor can be prevented.

The filter capacitors 3, the smoothing capacitors 4 (capacitors 3, 4), the layered unit 6 in which switching elements of the voltage converter circuit and the inverter circuit are layered, the substrate 22, and the reactor 10a are arranged in the case 40 of the PCU 2a. The first face 21a to which the lid 130 is to be attached is located closer to any one of the capacitors 3, 4 and the substrate 22 than the third face 21c.

On the PCU 2a of FIG. 12, the temperature sensor 131 is also arranged on an opposite side to the cooler 43 across the coil like the PCU 2 of FIG. 1. Please see FIG. 2 because the cooler 43 is not shown in FIGS. 11, 12. That is, of the two side faces, first face 21a and second face 21b parallel of the substantially square pole-shaped coil 12, the temperature sensor 131 is arranged on the first face 21 a as one face thereof while the other face (second face 21b) is in contact with the cooler 43. A temperature distribution is generated on the coil 12 by the cooler 43 and the temperature sensor 131 measures the highest temperature in the temperature distribution.

Matters which must be considered regarding the technology described in the above embodiments will be described. In the reactor 10a shown in FIGS. 11, 12 as well as the reactor 10 shown in FIGS. 1 to 6, the temperature sensor 31 (temperature sensor 131) is arranged in the window (window 13a or 13b) provided in the cover 13 of resin which covers the coil 12. In the examples shown in FIGS. 11, 12, the temperature sensor 131 is embedded in the lid 130 which covers the window 13a.

The leaf spring 32 for pressing the temperature sensor 31 against the coil 12 is an example of an elastic member. The PCU 2, 2a are an example of the power converter including the reactor. Further, the radiating sheet 42 and the cooler 43 are an example of the radiating member. Attachment of the cooler 43 to the second face 21b is carried out after resin is molded to the coil integrally.

A process of manufacturing a structure in which the reactor 10 or 10a and the resin cover 13 are formed integrally is an example of the process for producing a molded product. The process of manufacturing the molded product includes a process of mounting the reactor in the mold, a process of fixing the coil, and a process of injecting resin.

In the present embodiment, a first face and a second face of the coil correspond to two side faces parallel to each other of a substantially square pole-shaped coil. In another words, these two faces are faces (first face and second face) located at positions which sandwich the coil on the periphery of the coil. The first face and the second face may be both end faces of the coil. In particular, in a coil in which the rectangular wire is wound edgewise, a wide face of the rectangular wire is located on the coil end face. Thus, the first face may be formed on that face and the temperature sensor may be attached thereon. In particular, the coil side face can secure a wide area more easily than the coil end face and the wider area facilitates attachment of the temperature sensor. The shape of a cross section perpendicular to the winding axis of the coil may be circular, polygon or in other various shapes. Because a wide flat surface facilitates attachment of the temperature sensor, preferably, the coil is formed in a substantially square pole shape, the first face is formed on one face thereof and the temperature sensor is attached to the first face. The substantially square pole shape refers to a cylinder having a square cross section perpendicular to the winding axis of the coil. That is, preferably, the two side faces parallel to each other of a substantially square pole shaped coil are regarded as the first face and the second face.

In a reactor in which a large current flows, a flat and elongated metallic sheet called rectangular wire is used. The rectangular wire has a smaller internal resistance than a lead wire, so that an amount of heat generation when a large current flows is smaller than the lead wire. However, when passing a large current enough for driving a traveling motor, the amount of heat generation increases so that thermal control of the reactor is necessary. Thus, it is necessary to attach the temperature sensor and monitor an overheat in the reactor. On the other hand, because the rectangular wire is rigid as is different from the lead wire, it can hold a coil shape itself without being wound around a bobbin. In the meantime, even the coil of the rectangular wire may use the bobbin. In case where such a coil is combined with the core, dispersion occurs in dimensional tolerance of each section in the reactor. When the temperature sensor is attached to such a reactor, a distance between the temperature sensor and the coil may be dispersed. As a result, measurement accuracy of the coil temperature may be dispersed among a multiplicity of mass-produced reactors. As a countermeasure, the temperature sensor should be pressed against the coil by the elastic member. Because the temperature sensor is in contact with the coil due to this structure, measurement accuracy of the coil can be equalized among the mass-produced reactors. That is, by pressing the temperature sensor against the coil, the measurement accuracy of the coil temperature at the time of mass production can be prevented from being dispersed.

Specific embodiments of the present invention have been described in detail above; however, they are just examples and do not restrict the scope of claims of the present invention. Technology described in the scope of claims includes modifications and alterations of the specific embodiments exemplified above. Technical elements described in the present specification and drawings exert their technical availability alone or by various combinations thereof. In addition, the technology exemplified in the present specification and drawings can achieve multiple objects at the same time and achieving even an object thereof means securing the technical availability.

The invention claimed is:

1. A manufacturing method for a reactor in which resin for covering at least a part of a coil is formed integrally with the coil,
   the manufacturing method comprising:
   a step of manufacturing a molded product including following i) to iii),
      i) arranging the reactor in a cavity space for injection-molding of resin,
      ii) fixing the coil with surfaces of a mold brought into contact with a first face and a second face, the first face and the second face being located on a periphery of the coil, and the first face and the second face sandwich the coil, and
      iii) injecting resin into the cavity space to cover, with resin, at least a coil surface around the first face and a coil surface around the second face with the first face and the second face exposed, and
   a step of attaching a temperature sensor such that the temperature sensor is opposed to the first face.

2. The manufacturing method according to claim 1, wherein
   the first face and the second face are provided on side faces of the coil.

3. The manufacturing method according to claim 2, wherein
   a shape of the coil is of a substantially square pole.

4. The manufacturing method according to claim 1, further comprising:
   a step of attaching a radiating member to the second face after the step of manufacturing the molded product.

5. A reactor comprising:
   a core;
   a coil including a first face and a second face, the first face being a part of a periphery of the coil, and the second face locating at a rear side of the first face;
   a cover made of resin, the cover being configured to integrally cover a part of the coil, at least coil surfaces around the first face and the second face being covered with the cover, and the first face and the second face being exposed from the cover; and
   a temperature sensor attached such that the temperature sensor is opposed to the first face.

6. The reactor according to claim 5, wherein
   the cover is formed by injection-molding, and
   upon injection-molding, the surface of the mold makes contact with the first face and the second face in a cavity space, such that the first face and the second face are exposed.

7. The reactor according to claim 5, wherein
   the first face and the second face are provided on side faces of the coil.

8. The reactor according to claim 7, wherein
   a shape of the coil is of a substantially square pole.

9. The reactor according to claim 5, further comprising:
   a radiating member attached to the second face.

10. The reactor according to claim 9, wherein
    an area of the second face is larger than an area of the first face.

11. The reactor according to claim 5, further comprising:
    an elastic member configured to press the temperature sensor against the first face.

12. The reactor according to claim 11, further comprising:
    a supporting member configured to support the elastic member, wherein
    the coil is constituted of two coil bodies arranged such that winding axes of the coil bodies are parallel to each other, and
    the supporting member is fixed to the cover between the two coil bodies.

13. The reactor according to claim 5, further comprising:
    a lid that covers the first face, wherein
    the temperature sensor is provided in the lid.

14. A power converter comprising:
    a capacitor configured to smooth a current;
    a substrate;
    a reactor including:
       a core:
       a coil including a first face and a second face, the first face being a part of a periphery of the coil, and the second face locating at a rear side of the first face;
       a cover made of resin, the cover being configured to integrally cover a part of the coil, at least coil surfaces around the first face and the second face being covered with the cover, and the first face and the second face being exposed from the cover;
       a temperature sensor attached such that the temperature sensor is opposed to the first face;
       a lid that covers the first face, the temperature sensor being provided in the lid; and
       a third face being a part of the periphery of the coil and exposed from the cover; and
    a case which accommodates the capacitors, the substrate, and the reactor,
    wherein the first face is located closer to any one of the capacitor and the substrate than the third face.

15. A power converter comprising:
    a reactor including
       a core:
       a coil including a first face and a second face, the first face being a part of a periphery of the coil, and the second face locating at a rear side of the first face;
       a cover made of resin, the cover being configured to integrally cover the coil, at least coil surfaces around the first face and the second face being covered with the cover, and the first face and the second face being exposed from the cover;
       a temperature sensor attached such that the temperature sensor is opposed to the first face; and
       a radiating member attached to the second face of the reactor.

* * * * *